Figure 1:
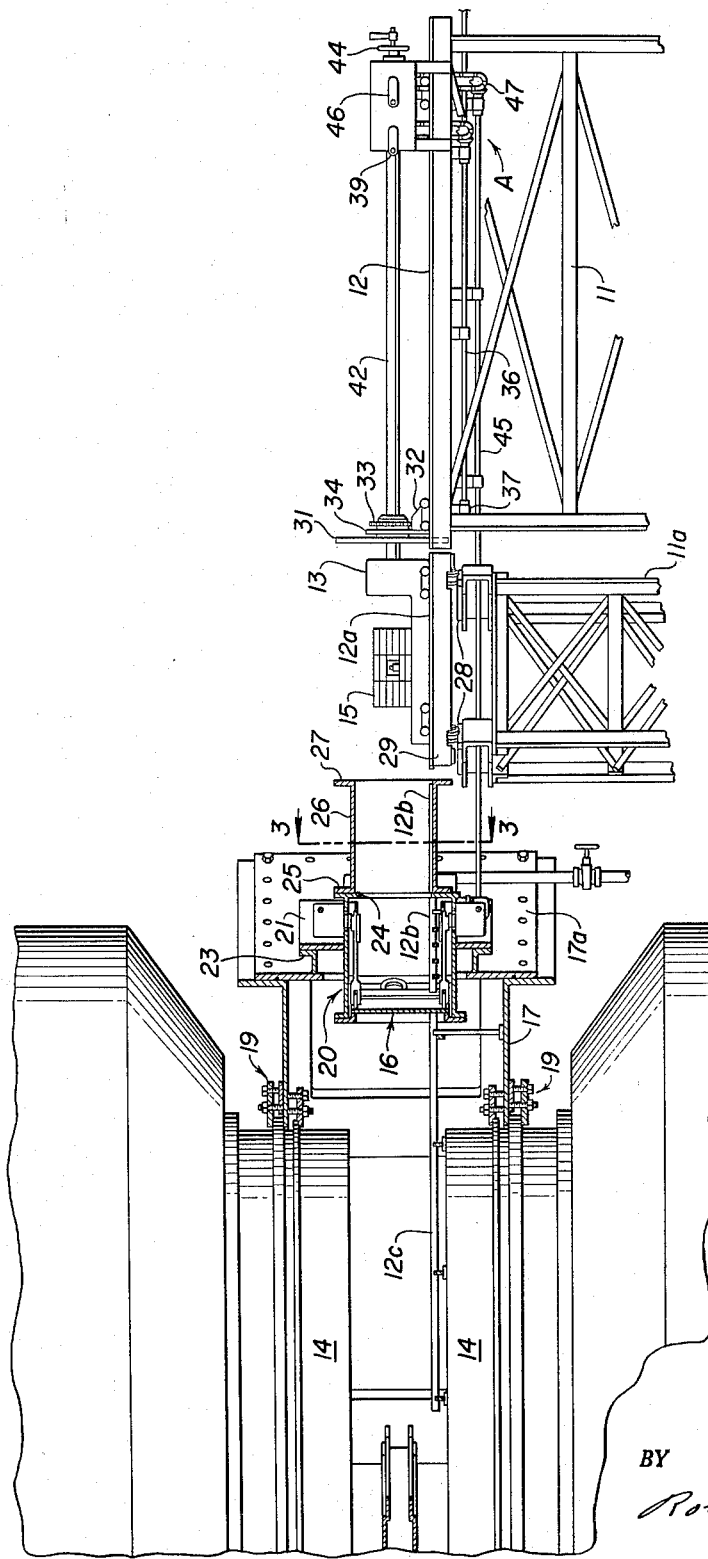

May 29, 1956 R. B. MEUSER 2,747,762
PRESSURE CHAMBER CLOSURE APPARATUS
Filed Aug. 5, 1952 5 Sheets-Sheet 1

INVENTOR.
ROBERT B. MEUSER
BY
Roland A. Anderson
ATTORNEY.

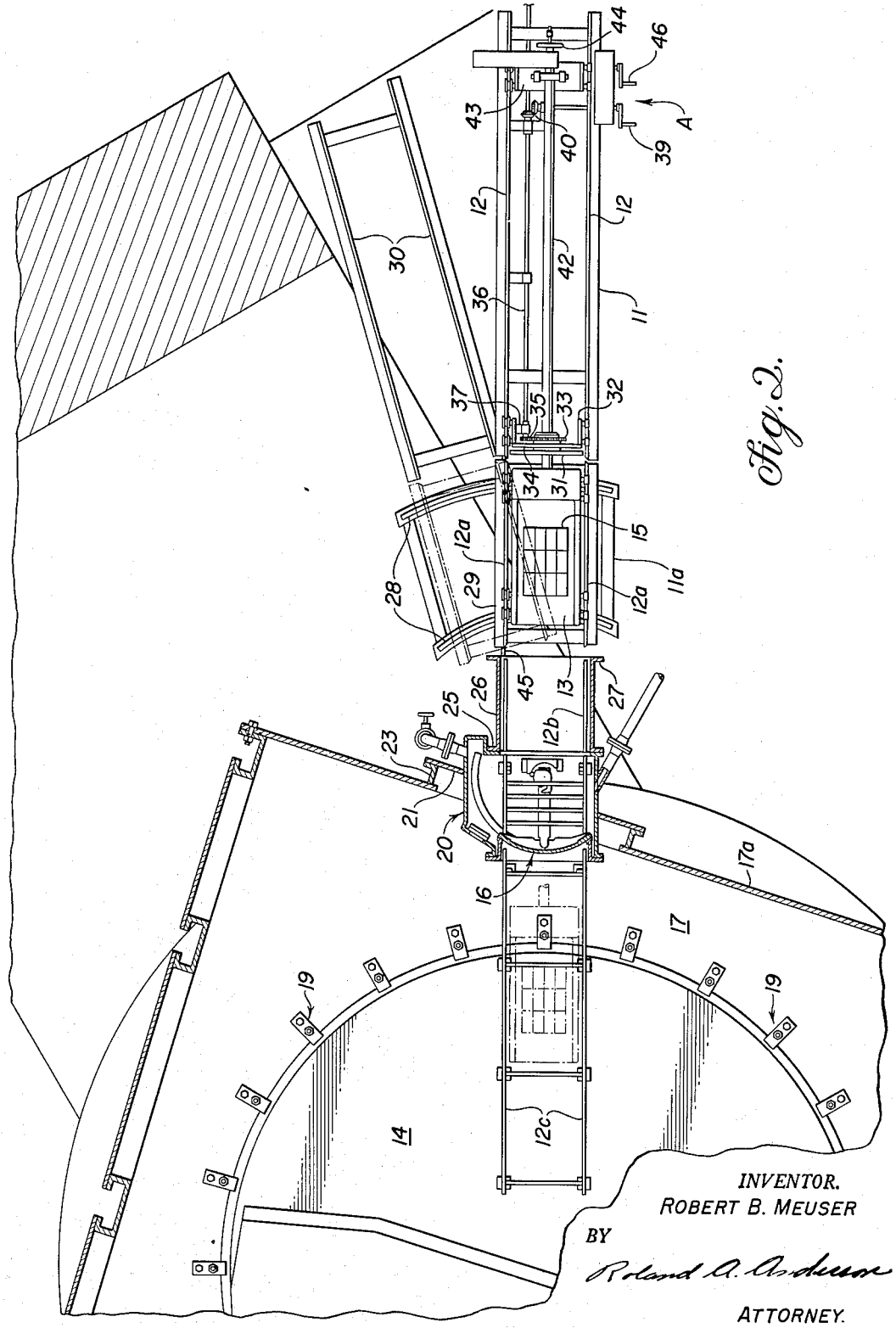

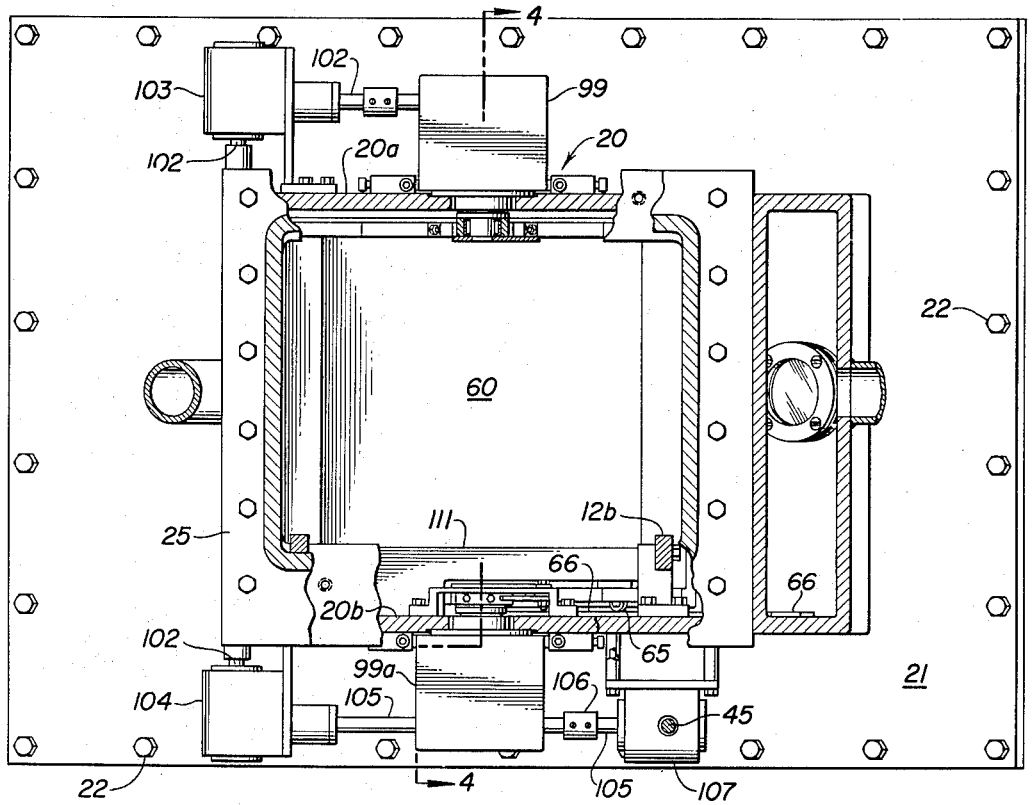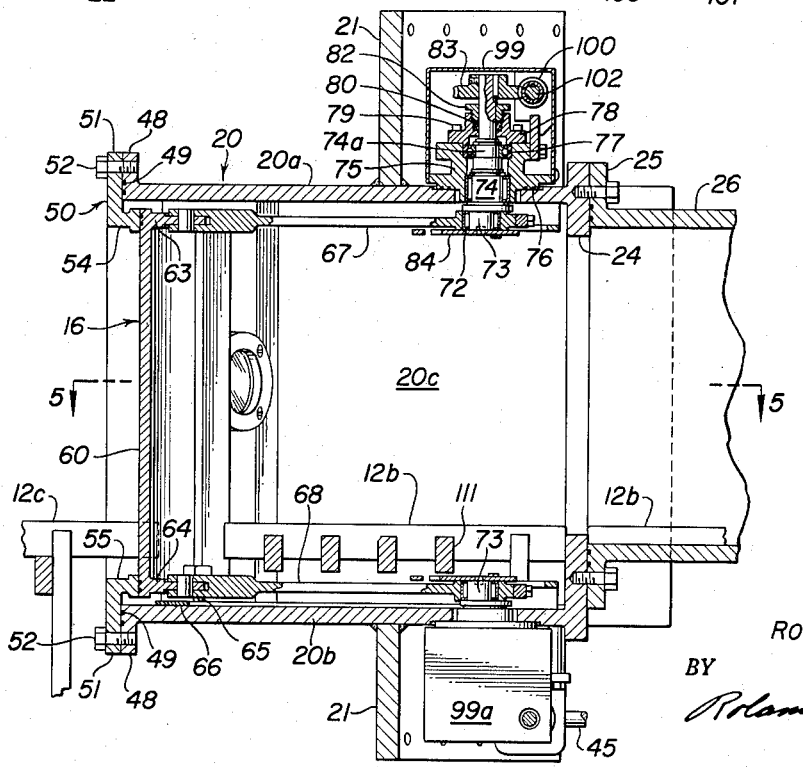

May 29, 1956  R. B. MEUSER  2,747,762
PRESSURE CHAMBER CLOSURE APPARATUS
Filed Aug. 5, 1952  5 Sheets-Sheet 4

INVENTOR.
ROBERT B. MEUSER
BY
Roland A. Anderson
ATTORNEY.

May 29, 1956 R. B. MEUSER 2,747,762
PRESSURE CHAMBER CLOSURE APPARATUS
Filed Aug. 5, 1952 5 Sheets-Sheet 5

INVENTOR.
ROBERT B. MEUSER
BY
Roland A. Anderson
ATTORNEY.

United States Patent Office 2,747,762
Patented May 29, 1956

2,747,762
PRESSURE CHAMBER CLOSURE APPARATUS

Robert B. Meuser, Oakland, Calif., assignor to the United States of America as represented by the United States Atomic Energy Commission Application August 5, 1952, Serial No. 302,851
4 Claims. (Cl. 220—30)

This invention relates to closures and more particularly to closures for pressure vessels of considerable size such as the pressure chambers of cyclotrons. In such apparatus access to the interior of the chamber frequently is required for the introduction of auxiliary apparatus such as probes, etc. It is highly desirable that the pressure conditions within the chamber be altered as little as necessary during such procedures to minimize the delays incident to re-establishing the prior pressure conditions and to reduce the work imposed on the pumping apparatus. Accordingly, it is customary to incorporate an airlock at the chamber opening through which such probes and other devices are introduced, such airlock being of sufficient size to accommodate the device presently to be employed. Since the inner opening of the airlock into the chamber is normally sealed off from the atmosphere by a removable closure and may also have its outer opening sealed by a suitable closure when the inner closure is opened to permit introduction of the probe, it will be readily apparent that the pressure change within the chamber will be affected only by the relatively small volume of the airlock.

In employing the procedures just described with large cyclotrons and necessitating probes, etc. of considerable cross-section, of the order of 15 x 20 inches, for example, unusual requirements have been encountered in the design and cycle of operation of the inner door for the airlock. This closure must be of relatively massive construction due to the pressures involved and must include a highly efficient seal for the entire perimeter of the chamber opening.

Accordingly, it is an object of the invention to provide a closure for the pressure chamber of cyclotrons which will effectively seal an opening having an area of the order of 15 x 20 inches.

Another object of the invention is to provide a closure for a pressure vessel as described which may be opened or closed by mechanism remotely controlled from the vessel exterior.

Another object of the invention is to provide a closure for a pressure vessel which is movable from a closed position to an open position in which neither the closure nor any of its operating appurtenances obstructs said opening.

A further object of the invention is to provide a closure for a pressure vessel which is movable from a fully closed position, arcuately about one edge thereof and thereafter laterally to a position of translation to one side of said opening.

A still further object is to provide a closure for airlock equipped cyclotron chambers which does not obstruct the airlock opening or require modification or adjustment of the foregoing structure in case the use of an airlock extension is desired.

Figure 5:
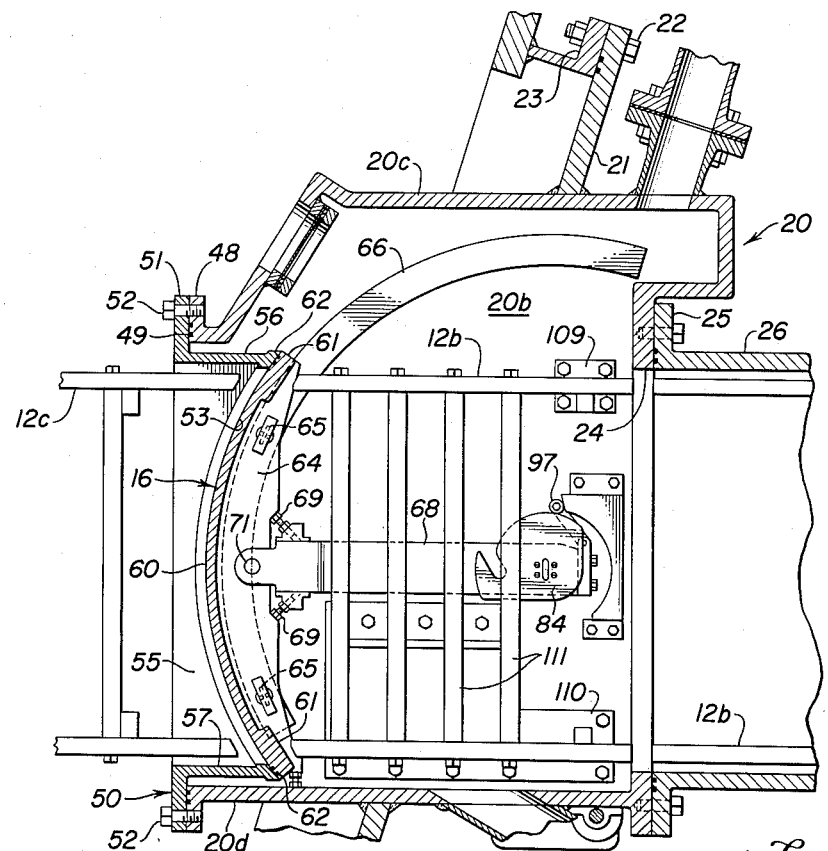
Figure 6:
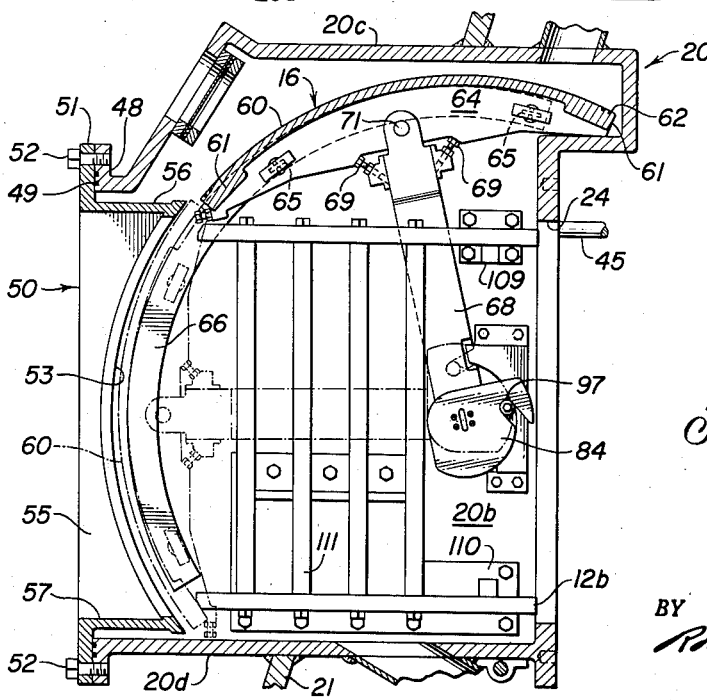
Figure 8:
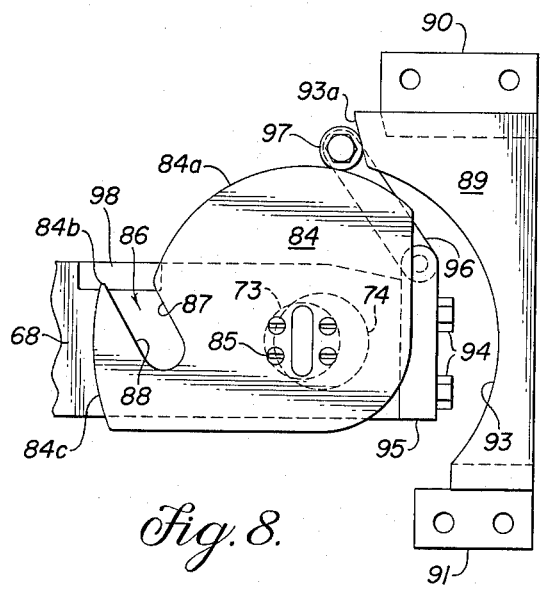
Figure 9:
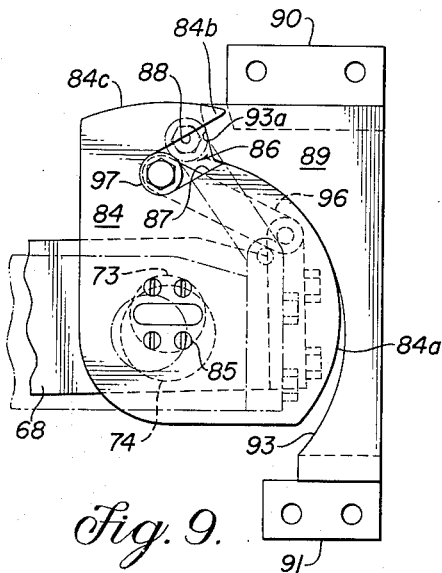
Figure 10:
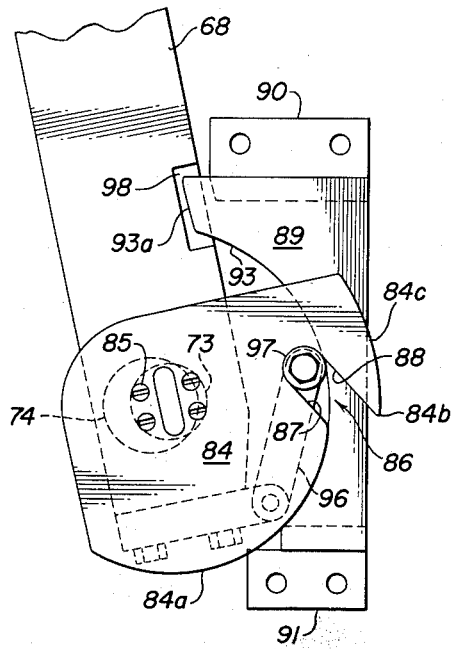
Figure 7:
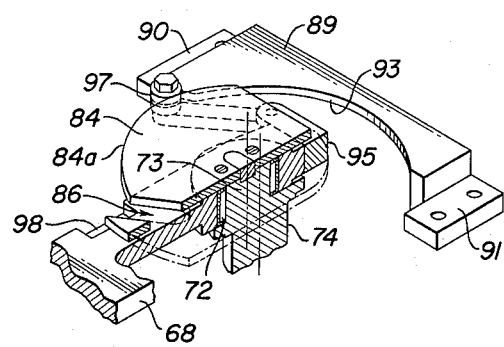

Further objects will be apparent from the following description taken in connection with the accompanying drawings wherein:

Figure 1 is an elevation, partly in section of a cyclotron tank equipped with the closure of this invention and showing also auxiliary equipment whose use is facilitated thereby;

Fig. 2 is a plan view of the structures shown in Fig. 1;
Fig. 3 is a sectional view taken on the line 3—3 of Fig. 1;
Fig. 4 is a sectional view taken on the line 4—4 of Fig. 3;
Fig. 5 is a sectional view taken on the line 5—5 of Fig. 4 and showing the closure disposed across the opening;
Fig. 6 is a view similar to Fig. 5 but showing the closure in a position of translation to one side of the opening;
Fig. 7 is a perspective view, partly in section, of the cam assembly which determines the course of movement of the closure;
Figure 8 is a plan view of the cam assembly corresponding to a closed position of the closure;
Fig. 9 is a view similar to Fig. 8 but corresponding to a partially open position of the closure; and
Fig. 10 is a plan view of the cam assembly corresponding to a fully open position of the closure.

As an aid to understanding the various aspects of the problem which is solved by the present invention and therefore to more easily appreciate the constructional advantages of the latter, reference will first be made to auxiliary apparatus, the efficient use of which is materially enhanced thereby. Reference is made therefore to Figs. 1 and 2 wherein there is shown at 11 a support for a horizontal track comprising a pair of spaced rails 12 for bearing the probe truck shown generally at 13 as resting on correspondingly aligned rails 12a of an intermediate support 11a to enable the probe truck 13 with its material to be irradiated (shown as a stack of lead bricks 15, for example) to be brought into the space between the oppositely disposed pole faces 14 of the cyclotron magnet; inner rails 12c are suitably supported by the upper face of the lower magnet pole and extend outwardly to the movable closure 16 later to be described.

Wall 17 of the cyclotron tank (Figs. 1 and 2) surrounds magnet poles 14 and extends outwardly therefrom, being conventionally bolted thereto at 19 and includes a vertically disposed, lateral wall structure 17a which is provided with a reinforced, box-like chamber 20 constituting an airlock. As shown in Figs. 1 and 3 the airlock components are carried by a generally rectangular plate 21 which is bolted at 22 to mating flanges 23 of the tank opening. Airlock 20 has not only the closure 16 disposable across its inner opening but also a flanged outer opening 24 adapted to receive in abutting relation the mating flange 25 of an airlock extension 26 having a similar flange 27 at its outer end. Aligned tracks 12b for truck 13 are supported by the lower wall of both the airlock 20 and its extension 26 but are conveniently made discontinuous across the junction of these parts so that separability will be unimpaired.

It will be observed from Fig. 2 that support 11a is considerably wider than the spacing of the tracks 12 and is surmounted by a pair of laterally and arcuately extending rails 28 carrying a dolly 29 which directly supports rails 12a. Since such dolly is of a width corresponding to that of support 11, it will be seen that the same may readily be locked into the continuous track relation shown in Figs. 1 and 2 by suitable means (not shown) or may be moved laterally thereof and with it the truck 13 so that the latter may thereafter be pushed on to the rails 30 constituting a "siding" angularly disposed with respect to rails 12.

Additional auxiliary apparatus includes a rectangular face plate 31 supported by truck 32 upon rails 12 and in its inoperable position extending down between said rails as shown in Fig. 1. When it is desired to move face plate 31 to a position of closure across the opening defined by flange 27 of airlock extension 26 or in the event the latter is not being used, across the flange of opening 24, truck 32 is moved manually along tracks 12a to a position in which face plate 31 is to the left of such tracks (Fig. 1) where upon it may be rotated 90° to its position of alignment by means of an integral ring gear 33, which with plate 31 is journaled in a supporting portion 34 of truck 32. A small gear 35 chain connected to gear 33 is fixed to a square shaft 36 supported by a guide 37 carried by truck 32. Rotation of shaft 36 to accomplish the 90° rotation of plate 31 is from a stationary control station A having a crank 39 having a gear 40 in mesh with a similar gear which is splined on shaft 36.

For interlocking plate 31 and truck 13 so that the two parts may be moved as a unit and also for enabling the truck separately to be moved to its innermost position between the pole faces 14 and withdrawn to any intermediate position, there is provided a cylindrical rod 42 supported at its outer end by a truck 43 movable along rails 12, passing through a bore of similar cross-section in the plate and its support 31, 34 and terminating in rotary type plug and socket connection (not shown) in truck 13. By rotating hand wheel 44 of rod 42 the foregoing locking or unlocking operation is easily accomplished.

Also, located at control station A are means whereby closure actuating shaft 45 may be rotated, such means in the present embodiment comprising a hand crank 46 connected by gearing and an intermediate chain 47 to such shaft.

The auxiliary apparatus just described and the routine steps of its operation emphasize the importance of controlling as many of such steps as possible from a remotely located station as A where radiation hazards are lessened. Accurate positioning of relatively heavy components necessitates the provision of trucks and supporting rails as previously described. In the pressure door of this invention and now to be described analogous peculiar operating requirements must be satisfied.

Accordingly, reference is now made to Figs. 3–6 which show the door structure as incorporated in airlock 20 which is supported by rectangular plate 21 previously mentioned. The upper and lower walls of airlock 20 are indicated by reference numerals 20a and 20b while the side walls are designated 20c and 20d. Each of such walls is provided with a flange 48 along its co-planar edge portion nearest the cyclotron pole faces 14, such flanges lying in a common vertical plane and constituting a surface adapted to be hermetically sealed through the provision of peripherally continuous grooves 49 which may retain suitable gasket material.

A unitary door frame 50, rectangular in outline and having a continuous peripheral flange 51 for seating against the surface provided by flanges 48 and there retained by means such as through bolts 52 presents an outwardly facing peripheral surface 53 curved about a vertical axis. It will be seen from Figs. 5 and 6 that door frame 50 includes upper and lower parallel walls 54, 55, respectively, having concave outer edge portions defining the curvature referred to and parallel side walls 56, 57 rectangular in outline. The outer edge portion of each of said walls is thicker than the body portion thereof to provide a closure surface of increased area.

Pressure door 60 for the outer opening of door frame 50 just described is a relatively massive plate curved in its outer surface in conformity with the generally cylindric surface defined by the outer edge portions of walls 54, 55, 56, and 57 and of increased cross-section opposite such edge portions of walls 56, 57 for greater rigidity as indicated at 61. The peripheral surface of door 60 in contact with the frame is preferably grooved to receive continuous rings of insulating material 62. Integral with door plate 60 are parallel, upper and lower segment plates 63, 64 to which are connected the door operating mechanism and to the lower of which wheels 65 mounted therein and spaced along an inner circumference thereof provide support in the fully open and intermediate door positions from an arcuate track 66 mounted on lower wall 29b of airlock 20.

For moving segments 63, 64 and therewith the integral door 60, there are provided upper and lower members 67, 68 conveniently referred to as swing bars each of which is bifurcated to provide terminal ears between which is received a corresponding segment and thereto pivoted symmetrically along a chord thereof as at 71. Since the action of swing bars 67, 68 in moving door 60, later to be described, is principally that of a crank, adjustable stops 69 are provided, one on each side of each swing bar for maintaining a selected angularity of the latter and its adjacent segment plate with a slight clearance between each stop and the segment to equally distribute pressure between the door and frame in closed position. At this point, it is desirable to note that the movement of bars 67, 68 is such as to slightly rotate door 60 about one straight edge thereof as shown by the dotted lines of Fig. 6, then pull the door to the right, and thereafter swing the same about a parallel axis into the position of translation shown in solid lines in the same figure. Mechanism for effecting such movement will now be described.

Each of swing bars 67, 68 is apertured near the end remote from pivot 71 to receive needle bearings 72 surrounding a crank pin 73 which is offset from and somewhat smaller in diameter than a crankshaft 74 with which it is integral. The latter, associated with the upper wall 20a of airlock 20 (Fig. 4) as well as lower wall 20b, respectively, is disposed within a bearing housing 75 which rests on intermediate circular insulating rings 76 above wall 20a and is suitably secured to such wall. Within housing 75 is provided a ball bearing 77 which surrounds an upper, reduced diameter portion 74a of crankshaft 74 and is retained in place by a gland 78 mounted on bearing 75 by means such as cap screws 79. Gland 78 is formed with an enlarged bore to receive the uppermost packing rings 80 retained by packing nut 82 and serving, together with the packing material already mentioned to prevent loss of vacuum through the crankshaft opening into wall 20a. Suitably keyed to the upper end of crankshaft 74, enabling the latter to be rotated from rod 45 and later to be described is a worm gear 83.

Assuming concurrent rotation of upper crankshaft 74 just described and its lower, identical and axially disposed counterpart on which is mounted swing bar 68, consideration will now be given to the associated swing bar mechanism which produces the desired movement of door 60. Reference is made therefore, to Figs. 7–10; wherein, there is shown a generally quadrant-shaped, rotatable cam plate 84 surmounting the upper end of crank pin 73 to which it is rigidly fastened as by screws 85 and provided with a curved cam edge 84a which is terminated by a chord-like slot 86 having parallel edge portions 87, 88, the more remote of which merges acutely at cam projection 84b into a cam edge 84c of greater radius but less length than cam edge 84a. Disposed at one side of cam plate 84 and in a plane parallel to and directly therebelow, is a stationary cam plate 89 having lower, stepped terminal portions 90, 91, by which it may be suitably mounted on the inner surface of lower wall 20b, for example. Cam plate 89 is provided with a concave cut-out establishing a curved cam edge 93 which partly surrounds cam plate 84 in the closed position of door 60 (Fig. 8), and terminates upwardly in a cam heel portion 93a. Securely united to the end of swing bar 68 beyond crank pin 73 by means such as bolts 94 is a clevis plate 95.

The clevis end of such plate projects beyond an angularly cut-away portion of swing bar 68 adjacent thereto, and between the ears thereof retains in pivotal relationship, a link 96 having a cam roller 97 mounted thereon.

The latter is of sufficient axial length to fully contact the adjacent cam surfaces 84a, 87, 88, and 93 of the respective cams in the sequential positions shown in Figs. 7–10. Referring again to the latter, it will be seen that door opening movement follows from the relative travel of the parts just described and their interaction. As crankshaft 74 rotates clockwise, crank pin 73 and with it cam 84 and the right end of swing bar 68 move principally upward and increasingly to the right for a short distance, raising roller 97 along the cam heel 93a and moving the door end of the swing bar 68 counterclockwise sufficiently to take up the slight lost motion between pivot 71 and stop 69. As rotation continues toward the relative position of parts shown in Fig. 9, roller 97 enters the slot 86, cam edge 88 thereof constraining the roller to move downwardly along cam heel 93a to its fully seated, solid line position in this figure. Concurrently, the displacement of crank pin to the right as well as upward has translated swing bar 68 to the right shifting the lower edge portion of the door 60 outwardly as indicated by the dot and dash lines of Fig. 6.

Continued rotation of crankshaft 74 results in rotation of both the cam 84 and swing bar 68 about the axis of the crankshaft as a unit by virtue of the retention of roller 97 in the bottom of slot 86 thereby moving the door 60 along track 66 to the solid line position of Fig. 6 which corresponds to Fig. 10 wherein heel 93a is shown stopped within a notch 98 on the swing bar.

When the crankshaft 74 is rotated in the opposite or counterclockwise direction to close the door 60, rotation of swing bar 68, cam 84, link 96, and roller 97 as a unit occurs due to the constraining influence of the cam edge 88 upon the roller 97 until the relation of parts shown in Fig. 9 again is reached, thereafter, roller 97 moves upwardly against heel 93a as the swing bar moves to the left to seat the door against its frame, the downward component of the crank pin (73) movement serving to reestablish the lost motion between the swing bar 68 and stop 69 to equally distribute the door-frame seating pressures.

From Fig. 4 it will be seen that the drive mechanism for crankshaft 74 and disposed above wall 20a is protected by a cover 99. Such mechanism includes also a worm gear 100 meshing with gear 83, the former being mounted on a shaft which is rotated by a vertically disposed shaft 102 (Fig. 3) through suitable gearing within a housing 103. It will be seen that shaft 102 extends from the housing 103 above and to one side of airlock 20 to a similar housing 104 below the latter wherein similar gearing receives rotary motion from a horizontal shaft 105. Drive mechanism similar to that enclosed by cover 99 is contained within lower cover 99a for actuating the associated swing bar, shaft 105 corresponding to shaft 102 and bearing a worm gear similar to gear 100, being continued, however, through a coupling 106 to housing 107 which provides customary bearings as well as gearing for the angularly disposed shafts 105 and 45.

From Figs. 4–6 it will be seen that the track constituted by rails 12, 12a and 12b is continued in both the airlock extension 26 and the airlock 20, such rails being indicated at 12b in the airlock extension and also their discontinuous extension in the airlock proper. The latter rest on suitable base plates bolted to the lower wall 20b such as 109 and 110 and in addition rest on tie bars 111 extending therebetween which also maintains their parallelism.

From the foregoing it will be observed that there has been provided a closure of unique characteristics and particularly suited to the exacting requirements of its use, and while the invention has been disclosed with respect to a single preferred embodiment, it will be apparent to those skilled in the art that numerous modifications and variations are possible within the spirit and scope of the invention and thus it is not intended to limit the invention except by the terms of the following claims.

What is claimed is:

1. In an airlock for a cyclotron vacuum chamber secured to and extending horizontally from a wall portion of said chamber and surrounding a wall opening of substantial area therein, said airlock including inwardly extending marginal elements defining an inner opening constituting the rectangular boundary of a cylindric surface curved about a vertical axis, closure apparatus comprising a curved track disposed in said airlock and extending in a horizontal plane below and laterally beyond said inner opening a cylindrically curved, rigid closure for said inner opening mounted for movement across and along said track, and mechanism disposed in nonobstructing relation to said inner opening in the open position of said closure for effecting said movement, said mechanism including vertically aligned means connected to vertically spaced points on said closure and similarly spaced points on said airlock for rotating the former from a fully open position to a blocking position in front of but variably spaced from said inner opening in the rotated direction of said closure and for thereafter moving said closure into perimetric contact with the boundary of said inner opening.

2. The combination of elements described in claim 1 and wherein said vertically aligned means includes a pair of spaced arms having adjustable lost-motion connection in respective horizontal planes with said closure, said arms being rotatably mounted on vertically aligned crank shafts having a common drive shaft.

3. The combination of elements described in claim 1 and wherein said vertically aligned means includes a pair of spaced arms rotatably mounted on vertically aligned crank shafts having a common drive shaft, a rotary cam mounted on each of said crank shafts, fixed cams mounted on opposite walls of said airlock and a link having one end thereof pivoted on the end of each of said arms remote from said closure and the other end bearing a roller which is disposable between the relatively movable surfaces of said cams to thereby affect the movement of said arms.

4. In an airlock for a cyclotron vacuum chamber secured to and extending horizontally from a wall portion of said chamber and surrounding a wall opening of substantial area therein, said airlock including inwardly extending marginal elements defining an inner opening constituting the rectangular boundary of a cylindric surface curved about a vertical axis, closure apparatus comprising a cylindrically curved, rigid closure for said inner opening, and means disposed in nonobstructing relation to said inner opening in the open position of said closure said means including a pair of vertically aligned swing bars pivotally connected to vertically spaced points on said closure through lost-motion connections adjustable in respective horizontal planes and also connected to similarly spaced points on said airlock for rotating the former from a fully open position to a blocking position in front of but variably spaced from said inner opening in the rotated direction of said closure and for thereafter moving said closure into equally distributed perimetric contact with the boundary of said inner opening.

References Cited in the file of this patent

UNITED STATES PATENTS

| | | |
|---|---|---|
| 691,069 | O'Rourke | Jan. 14, 1902 |
| 947,701 | Raymond | Jan. 25, 1910 |
| 1,405,728 | Tervo | Feb. 7, 1922 |
| 1,488,801 | Abbanese | Apr. 1, 1924 |
| 1,746,410 | Tolman | Feb. 11, 1930 |
| 2,610,366 | McKee et al. | Sept. 16, 1952 |
| 2,638,254 | Heltzel | May 12, 1953 |

FOREIGN PATENTS

| | | |
|---|---|---|
| 595,834 | France | July 25, 1925 |